Figure 1:
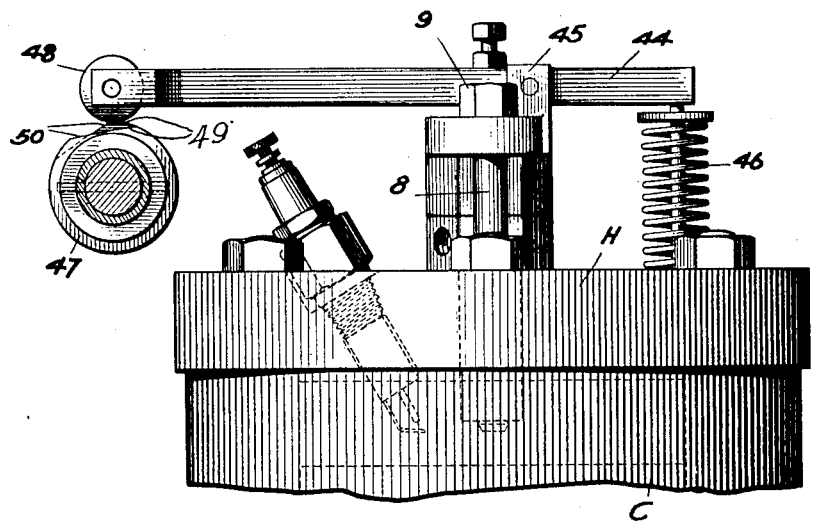

S. P. AND H. A. COWARDIN.
FUEL INJECTOR FOR INTERNAL COMBUSTION ENGINES.
APPLICATION FILED JULY 9, 1917. RENEWED DEC. 8, 1919.

1,393,090.

Patented Oct. 11, 1921.

3 SHEETS—SHEET 1.

Inventor:
Samuel P. Cowardin
and Harry A. Cowardin,
by their Attorney.

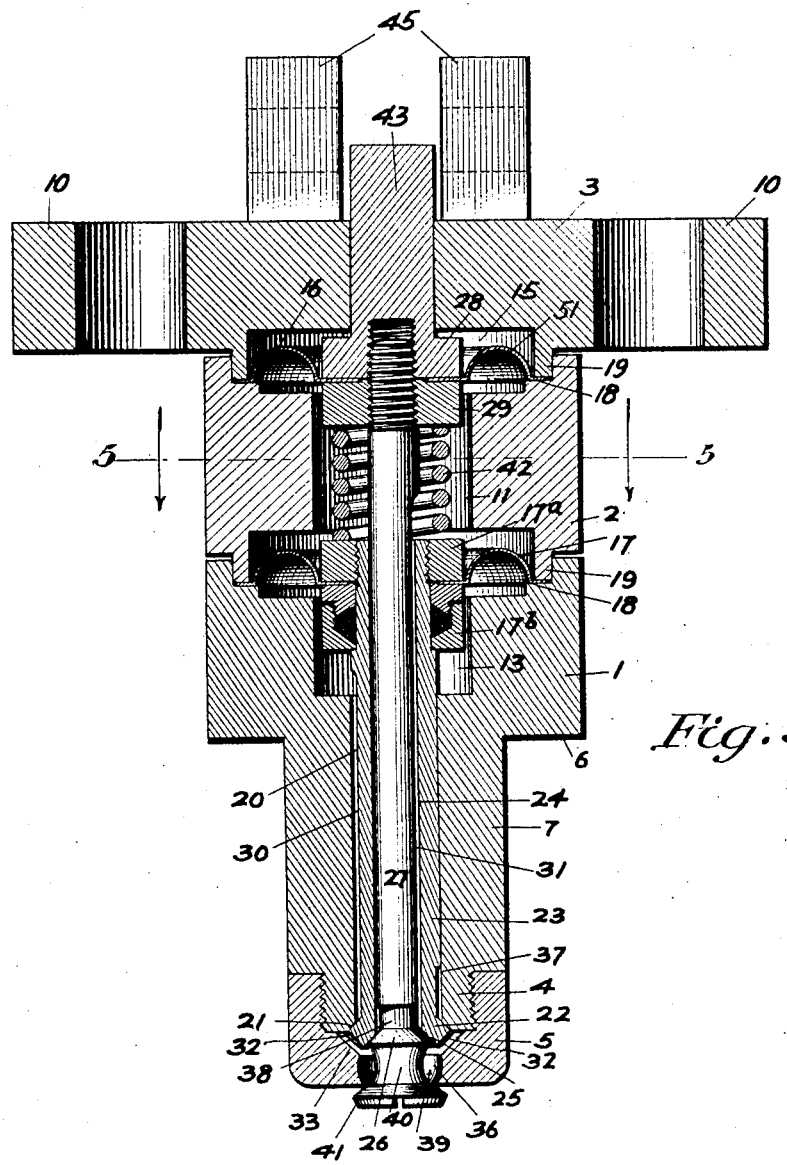

S. P. AND H. A. COWARDIN.
FUEL INJECTOR FOR INTERNAL COMBUSTION ENGINES.
APPLICATION FILED JULY 9, 1917. RENEWED DEC. 8, 1919.
1,393,090.
Patented Oct. 11, 1921.
3 SHEETS—SHEET 3.
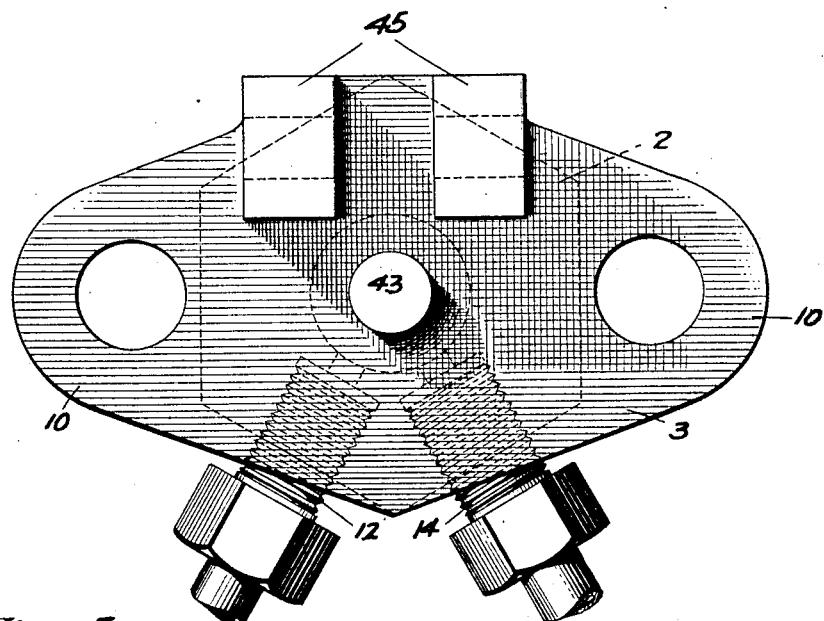
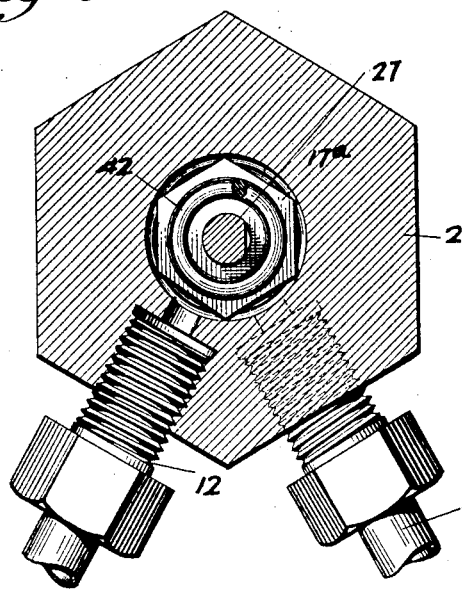
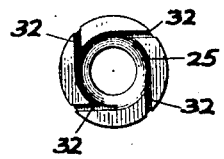
Inventor:

UNITED STATES PATENT OFFICE.

SAMUEL P. COWARDIN AND HARRY A. COWARDIN, OF RICHMOND, VIRGINIA.

FUEL-INJECTOR FOR INTERNAL-COMBUSTION ENGINES.

1,393,090. Specification of Letters Patent. Patented Oct. 11, 1921.

Application filed July 9, 1917, Serial No. 179,491. Renewed December 8, 1919. Serial No. 343,742.

*To all whom it may concern:*

Be it known that we, SAMUEL P. COWARDIN and HARRY A. COWARDIN, citizens of the United States, residing in Richmond, in the county of Henrico and State of Virginia, have invented certain new and useful Improvements in Fuel-Injectors for Internal-Combustion Engines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in fuel injectors for internal combustion engines, proposing a device which is applicable to engines operating on the Diesel cycle and adapted for the heavier and less volatile fuel oils. The present injector is of the broad or general type which includes air and oil valves functioning, in coöperation, to discharge the oil in an atomized or highly comminuted condition into the engine cylinder whereby it will form an explosive, or more strictly, combustible mixture with the air, admitted by the main air valve.

The principal objects of the invention briefly stated, are to provide a simply constructed injector wherein the amount of fuel mixture passed to the engine cylinder is regulated by the duration of the opening of the controlling valves and not necessarily dependent on the pulsations of the fuel pump, as in existing constructions; wherein especially effective provision is made against the leakage of air and fuel oil under the high pressures employed in a construction which admits of the ready dismantling of the various parts to promote facility of cleaning, renewal or repair; wherein provision is made for an especially strong and effective normal closure of the controlling valves; wherein the elements subject to pressure are specially constructed to withstand stresses yet to be sensitively responsive in the operation of the injector and to coöperate with adjacent parts in preventing the escape by leakage of oil and air; and wherein a thorough atomization and diffusion of the oil is effected in connection with its discharge from the injector.

With the above objects in view the invention consists in certain novel features of structure, combination and relation which will be set forth in detail as the description proceeds.

An embodiment of the invention is illustrated in the accompanying drawings, wherein:—

Figure 2:
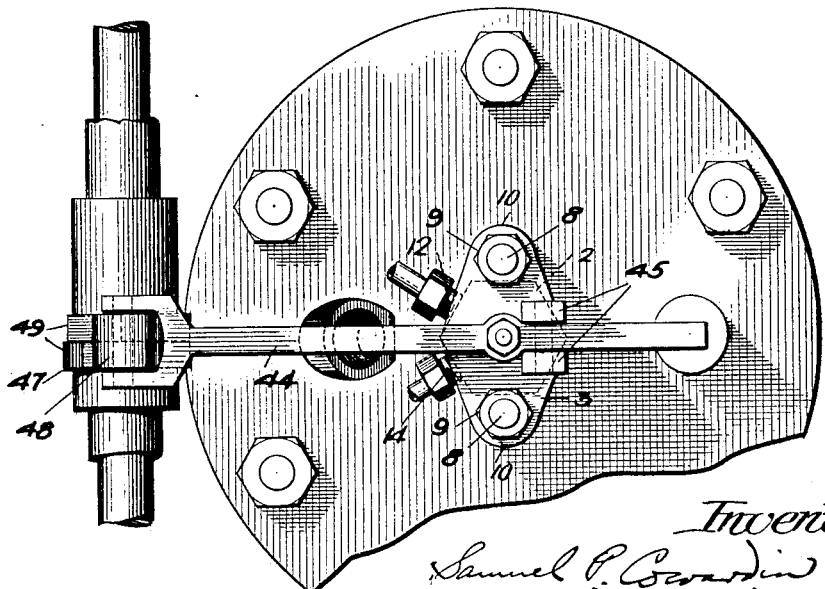

Figure 1 is a side elevation and Fig. 2 a plan view showing the injector as fitted to the engine cylinder, Fig. 3 is a vertical central sectional view of the injector, Fig. 4 is a plan view of the injector, Fig. 5 is a horizontal sectional view on the line 5—5 of Fig. 3, and Fig. 6 is a bottom plan view of the air valve of the injector.

Similar characters of reference designate corresponding parts throughout the several views.

The words "Upper" and "Lower" in the following description and claims are used with reference to the drawings and as synonymous with "inner" and "outer" respectively.

The casing or body of the injector is preferably made in three main parts or sections, viz., a lower section 1, an intermediate section 2 and an upper section 3. The section 1 has a reduced threaded extension 4 at its lower end which carries a cap 5; and intermediate its ends said section 1 is formed with an annular shoulder 6 providing a reduced lower portion 7. As fitted to the engine cylinder, the reduced portion 7 projects into said cylinder through an opening in the head H and the shoulder 6 bears with sealing effect against the upper face of said head.

The sections 1, 2 and 3 are securely clamped together and the injector as an entirety is secured to the engine cylinder by upright posts 8 secured in the head H and nuts 9 on the upper ends of said posts, the posts passing through oppositely located apertured lugs 10 formed with the section 3 and the nuts 9 acting with clamping effect on the upper faces of said lugs.

Interiorly the injector casing is divided into an oil chamber 11, having an oil inlet 12, an air chamber 13 located below the oil chamber and having an air inlet 14, and a clearance 15 located above the oil chamber; and the sections 2, 1 and 3 provide the annular walls of the respective chambers 11 and 13 and the clearance 15. The upper and lower walls of the oil chamber 11 are provided by movable elements 16 and 17, respectively, and which are preferably formed as resilient metallic diaphragms. The upper diaphragm 16 which, for convenience may be termed the "oil" diaphragm separates the oil chamber 11 from the clearance 15 and the lower diaphragm 17 which may be termed the "air" diaphragm similarly separates the chamber 11 from the air chamber 13.

The sections 1 and 2 have internal annular shoulders 18 and the sections 2 and 3 have annular projections 19 which aline and coact with the respective shoulders 18 in clamping the marginal portions of the diaphragms 16 and 17 with sealing effect against the leakage of air and oil, the clamping pressure exercised by said shoulders and projections being developed by the nuts 9. In this way a simple and extremely effective jointure is established between the adjacent sections 1 and 2 and 2 and 3 which is proof against the leakage of oil and air from the chambers 11 and 13 under the high pressures constantly maintained.

The section 1 is formed with an axially directed air passage 20 which extends from the lower end of the air chamber 13 to the lower end of said section 1 where it terminates in a valve seat 21 for coöperation with a normally closed air valve 22. The air valve 22 is provided at the lower end of an air valve stem 23 which projects through the air passage 20, air chamber 13 and a central opening in the air diaphragm 17 and is connected to said diaphragm by a nut 17$^a$ and a gland 17$^b$ bearing with sealing effect against the respective upper and lower faces of said diaphragm.

The air valve stem 23 is tubular and therefore provides the axially directed oil passage 24. Said oil passage is continued through the valve 22 and at its lower end terminates in a valve seat 25 for coöperation with a normally closed oil valve 26. The valve 26 is provided at the lower end of an oil valve stem 27 which projects, in concentric relation to the air valve stem, through the oil passage 24, oil chamber 11 and a central opening in the oil diaphragm 16 and is connected to said diaphragm by nuts 28 and 29 bearing with sealing effect upon the respective upper and lower faces of said diaphragm.

In order that they may be effectively guided and centered the valve stems 23 and 27 have a close fit in the bores which provide the respective passages 20 and 24; and to permit the flow of air and oil through said respective bores—in short to define said passages, the valve stems each have flat sides 30 and 31 respectively.

The fuel oil is thoroughly atomized and diffused in connection with its discharge from the injector directly into the engine cylinder and for this purpose the air and oil valves and cap 5 are specially formed to coöperate in providing an atomizing and mixing nozzle. The air valve 22 is formed as part of a rib circumscribing the lower end of the air valve stem 23 and said rib has a V-shaped cross section whereby its lower face which is provided with tangential ducts 32 leading to the oil valve seat 25 may coöperate with a seat 33 formed in the upper face of the cap 5 and leading to the central opening 36 of said cap.

The ducts 32 are equidistantly located and in order that the air may have access to all of them the air valve stem 23 has at its lower end a circumscribing groove 37 whereby the air flows uniformly through the annular space between the air valve 22 and its seat 21, entering the ducts 32 at the apex of the rib upon which the valve 22 is formed. In order that the oil may flow uniformly through the annular space or passage between the oil valve 26 and its seat 25 the oil valve stem 27 has at its lower end a circumscribing groove 38.

The oil issuing past the valve 26 and the air issuing from the ducts 32 meet at an angle in the opening 36 of the cap 5. The said opening is channeled whereby its wall co-acts, to provide a mixing chamber 39, with a channeled extension 40 of the oil valve stem 27, the extension 40 being located below the oil valve and within the opening 39. In the mixing chamber 39 the whirling streams of compressed air delivered by the ducts 32 cut across the outwardly directed film of oil and take the oil into suspension, thoroughly atomizing and intimately mixing with it as is obvious. To insure of the advantageous diffusion of the charge in the engine cylinder the extension 40 terminates, immediately below the cap 5, in a deflector 41.

The oil and air are constantly maintained in reservoirs at equal pressures suitably in excess of the compression pressure and are conducted by conduits (not shown) to the respective inlets 12 and 14. It follows that the diaphragm 17 is subject to equal pressure on both faces and hence is in unstressed equilibrium. The oil pressure acting against the lower face of the diaphragm 16 is effective to hold both the oil and air valves tightly to their seats, the oil valve 26 being directly held seated by the pressure against the diaphragm 16 and, in turn, effecting the seating of the air valve 22.

In the operation of the injector the oil diaphragm 16 is depressed to effect the opening of the valves; and the downward deflection of the diaphragm 16 is transmitted to the diaphragm 17 by a helical spring 42 surrounding the oil valve stem 27 and held under compression between the nuts 17ª and 29. When the diaphragm 16 is depressed the first effect is to depress the diaphragm 17 whereby the air valve 22 is unseated. The movement of the air valve is arrested by the seat 33 after which, the deflection of the diaphragm 16 being continued, the oil valve is unseated. When the depressing pressure on the diaphragm 16 is relieved, the oil pressure restores said diaphragm to its normal plane and is thereby effective first to close the oil valve against its seat 25 and thereafter to close the air valve against its seat 21. In this way the air valve opens before and closes after the respective opening and closing of the oil valve and it is therefore assured that all of the oil which is delivered past the oil valve will be taken up and atomized by the air and diffused into the engine cylinder.

The amount of fuel supplied depends upon the duration of the interval in which the oil valve is held open, since the pressure under which the oil is discharged is constant; and it is therefore preferred to operate the oil valve mechanically. For this purpose the nut 28 is provided with an axial upward extension 43 which projects through an opening in the section 3 and is in co-operation with an operating lever 44. The lever 44 is pivotally supported between a pair of lugs 45 conveniently provided on the section 3 and is moved to effect the depression of the diaphragm 16 by a strong actuating spring 46 which engages one end of said lever. The operative movements of the lever 44 are controlled by a cam 47 driven from the crank shaft of the engine and engaging a friction roller 48 with which the lever is provided. The cam 47 is preferably of special construction, including a pair of juxtaposed disks 49 having flattened marginal portions 50 whose planes, projected, intersect. Obviously by a suitable selection of the relative location of the disks 49 the marginal portions 50 may be set to give a dwell of a particular length desired; and when the roller 48 travels in the dwell thus provided the spring 46 is effective to actuate the lever 44 in causing the downward deflection of the diaphragm 16 and the consequent operation of the oil valve, as described. It will be noted that in the preferred construction disclosed both valves are operated by a single element, viz., the lever 44.

There is of course no fluid pressure in the clearance 15 and it follows that the oil diaphragm 16 is subject to constant stress under the pressure of the oil maintained in the chamber 11. Having this condition in mind the diaphragm 16 is preferably of the special form shown, that is to say, the whole of its area between its inner and outer clamped marginal portions is formed as an annular rib 51 of preferably semi-circular cross section whose convex side faces upward. The pressure of the oil acts from within the lines of the cross sectional semi-circle and when the diaphragm is at rest the stresses are purely those of tension. When the diaphragm is deflected the distortion is evenly distributed throughout the semi-circle of the cross section, the diaphragm yields with a rolling motion and hence does not bend sharply at any point, and at no point does the distortion exceed or even closely approach the elastic limit. It follows that the useful life of the diaphragm will be indefinite.

It will be observed that the mixing of the fuel oil and air takes place in the engine cylinder C at the point of free discharge of the mixture from the injector nozzle within the combustion chamber in contradistinction to effecting the mixture and air within the nozzle outside of the combustion chamber and then the discharge of the mixture into the cylinder or combustion chamber. Under our invention a stream of fuel is projected through a stream of air within the cylinder or combustion chamber at the point of free discharge of the fuel and air injected one through the other within the combustion chamber and the moment that the mixture of fuel and air is cut off from the chamber a stream of air is discharged directly into the chamber so that all particles of the fuel are cleared from the tip of the injector nozzle and the formation of carbon prevented. It is the formation of the mixture within the engine or combustion chamber by the projection under pressure of one stream through the other within the combustion chamber and expansion of the projected stream of air as it passes through the stream of fuel at the point of discharge from the nozzle directly into the chamber, instead of forming the mixture within the nozzle at a point outside of the chamber and giving no opportunity for expansion of the stream of air as it is projected through the stream of fuel and then discharging the mixture into the combustion chamber, that contributes to the high efficiency attained in the atomization of the particles of liquid fuel that makes possible the complete combustion that takes place in the combustion chamber.

For convenience in manufacture the diaphragm 17 is preferably made in the same form.

Having described our invention and set forth its merits, what we claim is:—

1. A fuel oil injector for internal combustion engines having oil and air passages whose discharge ends are in juxtaposition, oil and air chambers supplying said passages and in which oil and air are maintained under constant equal pressures, a movable element separating the oil chamber from the air chamber and subject to the pressures in both chambers, oil and air valves controlling the respective passages, a movable element for directly operating the oil valve and subject to the pressure of the oil in said oil chamber, thereby to hold the oil valve normally closed, the oil valve being related to the air valve to effect the normal closure thereof, means of connection between the air valve and the movable element separating the oil and air chambers, means for periodically moving the second named movable element to open the oil valve and means whereby the oil valve opening motion of the second named movable element is transmitted to the first named movable element, thereby to effect the opening of the air valve.

2. A fuel oil injector for internal combustion engines having concentric oil and air passages whose discharge ends are in juxtaposition, oil and air chambers supplying said passages and in which oil and air are maintained under constant equal pressures, an air diaphragm separating the oil chamber from the air chamber and subject to the pressures in both chambers, an air valve controlling the air passage, a stem for said valve extending through the air passage and air chamber and connected to said diaphragm, said stem having a central bore which constitutes said oil passage, an oil valve controlling the oil passage, a stem for said oil valve extending through said oil passage and said oil chamber, an oil diaphragm subject to the pressure of oil in the oil chamber and to which said oil valve stem is connected, means for periodically deflecting the oil diaphragm to effect the opening of the oil valve, and means whereby the oil valve opening motion of the oil diaphragm is transmitted to the air diaphragm, thereby to effect the opening of the air valve.

3. A fuel oil injector for internal combustion engines having oil and air chambers in which oil and air are maintained under constant equal pressures, oil and air passages supplied by said chambers, valves controlling said respective passages, movable pressure responsive elements for controlling the operations of said valves, the first of said elements being subject to the pressure in but one of said chambers and serving to operate the second element which is subject to the pressures in both chambers in effecting the opening of the valve controlled by said second element, and means for periodically operating the first element to effect the opening of the valve controlled thereby.

4. A fuel oil injector for internal combustion engines having oil and air chambers in which oil and air are maintained under constant equal pressures, oil and air passages supplied by said chambers, valves controlling said respective passages, pressure responsive diaphragms for controlling the operations of said valves, the first diaphragm being subject to the pressure in but one of said chambers and serving to operate the second diaphragm which is subject to the pressures in both chambers in effecting the opening of the valve controlled by said second diaphragm, means for periodically operating the first diaphragm to effect the opening of the valve controlled thereby, the injector having a casing formed in sections and the marginal portions of said diaphragms being clamped by and between the adjacent sections of said casing, and means for securing the injector to the engine cylinder with which it is used, said securing means causing the sections of the injector casing to exert clamping and sealing pressure on said diaphragms.

5. A fuel oil injector for internal combustion engines having a casing made in sections, a fluid delivery passage, a valve controlling said passage, a pressure responsive diaphragm controlling the operation of said valve, the marginal portion of said diaphragm being clamped by and between adjacent sections of said casing, and means for securing said injector to the engine cylinder with which it is used, said means causing the sections of said casing to exert clamping and sealing pressure on the marginal portion of said diaphragm.

6. A fuel oil injector for internal combustion engines having a fluid chamber in which fluid is maintained under pressure, a fluid delivery passage, a valve controlling said passage, a valve stem carrying said valve and extending through said passage, a resilient metallic diaphragm to whose central portion said valve stem is secured, and means for clamping the marginal portion of said diaphragm, said diaphragm being subject to stress in consequence of the pressure in said chamber and having its pressure exposed portion formed as an annular rib of arched cross section whereby the pressure within the chamber will act on said diaphragm within the arch of its cross section and develop therein uniformly distributed purely tensile stresses.

7. A fuel oil injector for internal combustion engines having an oil chamber and an air chamber in which oil and air are constantly maintained under equal pressures, a diaphragm responsive only to the pressure in one of said chambers, a second diaphragm separating the chambers and subject to the pressures in both of them, oil and air passages supplied by said chambers, valves controlling said passages and operated by said respective diaphragms, the first diaphragm serving to operate the second in effecting the opening of the valve which said second diaphragm controls and means for periodically operating the first diaphragm.

8. A fuel oil injector for internal combustion engines having an oil chamber and an air chamber in which oil and air are constantly maintained under equal pressures, a resilient metallic diaphragm responsive only to the pressure in the oil chamber, a second diaphragm separating the chambers and subject to the pressures in both of them, oil and air passages supplied by said chambers, valves controlling said passages and operated by said respective diaphragms, the first diaphragm serving to operate the second in effecting the opening of the valve which said second diaphragm controls, the first diaphragm having that portion of its area subject to pressure formed as an annular rib of semi-circular cross section whereby the pressure within the oil chamber will act on said diaphragm within the semi-circle of its cross section and develop therein uniformly distributed purely tensile stresses, and means for periodically operating the first diaphragm.

9. A fuel oil injector for internal combustion engines having a fluid chamber in which fluid under pressure is maintained and a resilient metallic diaphragm responsive to the pressure in said chamber, said diaphragm having its pressure exposed portion formed with uniformly curved cross section whereby the pressure within the chamber will act on said diaphragm within the curve of its cross section and develop therein uniformly distributed purely tensile stresses.

10. A fuel oil injector for internal combustion engines having a fluid chamber in which fluid under pressure is maintained and a resilient metallic diaphragm responsive to the pressure in said chamber, said diaphragm having its pressure exposed portion formed as an annular rib of semi-circular cross section whereby the pressure within the chamber will act on said diaphragm within the semi-circle of its cross section and develop therein uniformly distributed purely tensile stresses.

11. A fuel oil injector for internal combustion engines having an oil chamber in which oil is maintained under constant pressure, an air chamber in which air is maintained under constant pressure, passages supplied by said chambers, valves controlling said passages, a pressure responsive element subject to the pressure in one of said chambers for operating the valve which controls the discharge of fluid from said chamber, means for operating the other valve in connection with the operation of the first valve and mechanical means for periodically operating said pressure responsive element.

12. A fuel oil injector for internal combustion engines having an oil chamber and an air chamber in which oil and air are constantly maintained under equal pressures, a diaphragm responsive only to the pressure in one of said chambers, said diaphragm having a projection, a second diaphragm separating the chambers and subject to the pressures in both of them, oil and air passages supplied by said chambers, valves controlling said passages and operated by said respective diaphragms, the first diaphragm serving to operate the second in effecting the opening of the valve which said second diaphragm controls, and a spring pressed cam controlled lever engaging said projection to periodically operate the first diaphragm.

13. A fuel oil injector for internal combustion engines having an air passage, a tubular element located therein and providing an oil passage, said passages having valve seats, a rib formed on said tubular element and providing an air valve for coöperation with the seat in the air passage, said rib having its under face tangentially grooved, a seat for coöperating with the grooved under face of said rib, an oil valve for coöperation with the seat in the oil passage, the said grooves delivering air streams at an angle to the stream of oil discharging past the oil valve, and a cap having a control opening in which the streams of air and oil discharged by said valves form an intimate mixture.

14. A fuel oil injector for internal combustion engines having oil and air chambers in which oil and air are maintained under pressure, oil and air passages supplied by said chambers, valves controlling said respective passages, said valves being located at the discharge end of the injector nozzle and so positioned in relation to each other that the air discharge will be between the air valve and combustion chamber and a stream of air and a stream of fuel are projected one through the other within the combustion chamber so as to permit expansion of the stream of air as it is projected through the stream of fuel, and means for actuating the valves to permit first projection of a stream of air and then a stream of fuel one through the other and finally a stream of air after cutting off the stream of fuel.

In testimony whereof we affix our signatures in presence of two witnesses.

SAMUEL P. COWARDIN.
HARRY A. COWARDIN.

Witnesses:
O. E. PARRISH,
W. B. SIMON, Jr.